United States Patent [19]
Nishimura

[11] Patent Number: 5,387,928
[45] Date of Patent: Feb. 7, 1995

[54] ELECTRONIC ENDOSCOPE SYSTEM HAVING BOTH STILL AND MOVING IMAGES

[75] Inventor: Shigeru Nishimura, Saitama, Japan

[73] Assignee: Fuji Photo Optical Co., Ltd., Saitama, Japan

[21] Appl. No.: 166,376

[22] Filed: Dec. 14, 1993

Related U.S. Application Data

[63] Continuation of Ser. No. 706,156, May 28, 1991, abandoned.

[30] Foreign Application Priority Data

May 29, 1990 [JP] Japan .................................. 2-139044
May 29, 1990 [JP] Japan .................................. 2-139045
Aug. 16, 1990 [JP] Japan .................................. 2-216203

[51] Int. Cl.[6] ............................................. H04N 7/18
[52] U.S. Cl. ........................................ 348/70; 348/560
[58] Field of Search ................. 348/70, 268, 269, 270, 348/271, 560, 65

[56] References Cited

U.S. PATENT DOCUMENTS

| | | | |
|---|---|---|---|
| 4,602,281 | 7/1986 | Nagasaki et al. | 358/98 |
| 4,712,133 | 12/1987 | Kikuchi | 358/160 |
| 4,901,143 | 2/1990 | Uehara et al. | 358/222 |
| 4,920,413 | 4/1990 | Nakamura et al. | 358/98 |
| 4,933,757 | 6/1990 | Kanno et al. | 358/105 |
| 5,031,036 | 7/1991 | Kikuchi | 358/98 |
| 5,034,888 | 7/1991 | Uehara et al. | 358/98 |

FOREIGN PATENT DOCUMENTS

| | | | |
|---|---|---|---|
| 0167576 | 7/1988 | Japan | H04N 5/212 |
| 0086106 | 3/1989 | Japan | 358/98 |
| 241131 | 2/1990 | Japan . | |
| 241132 | 2/1990 | Japan . | |
| 255030 | 2/1990 | Japan . | |
| 2181323 | 4/1987 | United Kingdom | H04K 11/00 |

Primary Examiner—Alvin E. Oberley
Assistant Examiner—Minsun Oh

[57] ABSTRACT

An electronic endoscope system which picks up images by colors sequentially in a field sequential method, simultaneously converts the field sequential image signals obtained thereby, and reproduces the images as color images. The electronic endoscope system sample checks at every given cycle whether an image being currently picked up is a still picture image or a moving picture image. In the electronic endoscope system, the field sequential image signals are simultaneously. Each time the currently picked-up image is found as a still image, the storage contents of the memory means are updated to the latest field sequential image signals. Due to this, the memories can always store the latest field sequential image signals with no color discrepancies, e.g. shift. If a freeze instruction is input, then the updating of the storage content of the memories is immediately inhibited, so that the latest still image signals having no color discrepancies can be obtained from the memories.

9 Claims, 7 Drawing Sheets

FIG. 3(A) VD PULSE

FIG. 3(B) RGB FIELD SEQUENTIAL IMAGE SIGNAL

FIG. 3(C) EVEN FIELD IMAGE SIGNAL

FIG. 3(D) COMPARISON SIGNAL

FIG. 3(E) G-EN PULSE

FIG. 3(F) DECISION PULSE

FIG. 3(G) EN PULSE

FIG. 3(H) OUTPUT OF AND CIRCUIT 66

FIG. 3(I) FREESE INSTRUCTION SIGNAL

FIG. 3(J) REWRITE INSTRUCTION PULSE

FIG. 3(K) OUTPUT OF FIELD MEMORY 42

FIG. 3(L) OUTPUT OF FIELD MEMORY 44

FIG. 3(M) OUTPUT OF FIELD MEMORY 46

ELECTRONIC ENDOSCOPE SYSTEM HAVING BOTH STILL AND MOVING IMAGES

This application is a continuation divisional, continuation-in-part, of application Ser. No. 07/706,156 filed on May 28, 1991, now abandoned.

BACKGROUND OF THE INVENTION

1. Field of the Invention

The present invention relates to an electronic endoscope system and, in particular, to a medical electronic endoscope system which picks up images in a field sequential manner.

2. Description of the Related Art

A field sequential image pickup method, which is capable of obtaining from a single CCD two-dimension sensor color images corresponding to illumination lights of respective colors sequentially, is effective when a large number of CCD two-dimension sensors cannot be used and thus, in recent years, such field sequential image pickup method has been applied to a medical electronic endoscope system.

The electronic endoscope system of the above-mentioned type is arranged such that field sequential image signals by colors obtained by sequentially picking up images corresponding to illumination lights can be converted simultaneously by means of red, green and blue field memories and then can be reproduced on a color TV as color images. Also, in such electronic endoscope system, if a freeze instruction to make the monitor images stand still is applied, then the memory images of the red, green and blue field memories are latched and the still images can be monitored. Further, if such electronic endoscope system is connected to a hard copy device and a recording instruction is given, then the still images can be hard copied.

In field sequential image pickup method, the color images in the respective color channels are produced each delayed by a frame, and they are converted simultaneously and are then reproduced as the color images. For this reason, in a conventional electronic endoscope system, if the monitor images are caused to stand still by the freeze instruction, then color discrepancies may occur in the still monitor images because of movements between an object to be photographed and the leading portion of the endoscope.

Then, conventionally, in order to prevent the occurrence of the color discrepancies in the still monitor images, there have been proposed several electronic endoscope systems (see Japanese Patent Application Laid-open (Tokkai) No. 2-41131, (Tokkai) No. 2-41132 and (Tokkai) No.2-55030) in which, if a freeze instruction is input, then it is checked whether the image being currently picked up is a still image or a moving image, and only when it is decided to be the still image, the storage images of the red, green and blue field memories are latched so as to obtain a still image having no color discrepancies.

However, in the above-mentioned conventional electronic endoscope systems, if the image being currently picked up is decided to be a moving image when the freeze instruction is input, the stored images of the respective color field memories may not be latched and thus the still image cannot be obtained immediately. In this case, a time discrepancy occurs from the output of the freeze instruction to the time when a still image with no color discrepancy can be obtained actually.

SUMMARY OF THE INVENTION

The present invention aims at eliminating the drawbacks found in the above-mentioned conventional electronic endoscope systems.

Accordingly, it is an object of the invention to provide an electronic endoscope system which is capable of always reproducing a still image with no color discrepancies even in a field sequential image pickup method by use of a freeze instruction and also capable of immediately stopping a desired scene whenever it is desired to stop with no time lag to be felt.

It is another object of the invention to provide an electronic endoscope system which is capable of switching a moving image being currently picked up and the abovementioned still image with no color discrepancy into a single monitor and displaying them.

It is still another object of the invention to provide an electronic endoscope system which is capable of displaying a moving image being currently picked up and the above-mentioned still image with no color discrepancy at the same time on a single monitor.

In order to achieve the above objects, according to the invention, there is provided an electronic endoscope system which sequentially picks up images by colors in a field sequential method, simultaneously converts filed sequential image signals obtained by such image pickup method so that the converted sequential image signals can be reproduced as color images, said electronic endoscope system comprising:

memory means for storing field image signals each of 1 field or 1 frame by colors and outputting them simultaneously;

decision means for inputting the field sequential image signals each of 1 field or 1 frame at a given cycles and deciding whether each of the field sequential image signals is a still image or a moving image in accordance with field sequential image signals before and after the thus input field sequential image signals of 1 field or 1 frame at every given cycle; and, control means, whenever said decision means decides said signal as a still image, for updating the storage content of the memory means to the latest field sequential image signal and for prohibiting the updating of the storage content of said memory means when a freeze instruction is input.

According to the invention, the image being currently picked up is sample checked every given cycle whether it is a still image or a moving image. And, the field sequential image signals are stored by colors and the storage contents of the memory means for outputting these image signals simultaneously are updated to the latest field sequential image signals each time the currently picked up image is decided as the still image. By means of this, the latest field sequential image signal with no color discrepancy can always be stored in the memory means.

Also, if a freeze instruction is input, then the updating of the storage content of the memory means is prohibited so as to be able to obtain the latest still image signal with no color discrepancy from the memory means.

According to another embodiment of the invention, in addition to the above-mentioned memory means (which is referred to as a second memory means in this specification), there are provided another memory means (which is referred to as a first memory means in this specification) which stores field sequential image signals being currently picked up and outputs these image signals simultaneously, and switching means which switches the outputs of the above-mentioned first and second memory means and then outputs the thus switched outputs. The switching means is arranged such that, if a freeze instruction is input therein, then it is switched to the output of the second memory means, whereby moving and still imaged can be switched and displayed on a single monitor.

According to still another embodiment of the invention, there are provided display means, and display control means which inputs simultaneous first and second color image signals respectively output from the above-mentioned first and second memory means, displays a color image corresponding to the first color image signal on the screen of the display means in a large scale as well as displays a color image corresponding to the second color image signal on the same screen in a small scale while the freeze instruction is not being input, and displays a color image corresponding to the above-mentioned second color image signal on the screen of the display means at least on a large scale when the freeze instruction is input.

According to the last-mentioned embodiment of the invention, the moving and still images can be switched and displayed when the need arises by on a single display means in accordance with the outputs of the first and second memory means and, at least while the moving image is being displayed, a color image with no color discrepancy based on the output of the second memory means can be displayed on a small scale in a portion of the screen of the display means. This display of the -color image with no color discrepancy can be used as a standard when a scene desired to stop is selected.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of an electronic endoscope system according to the present invention with reference to the accompanying drawings.

Figure 1:
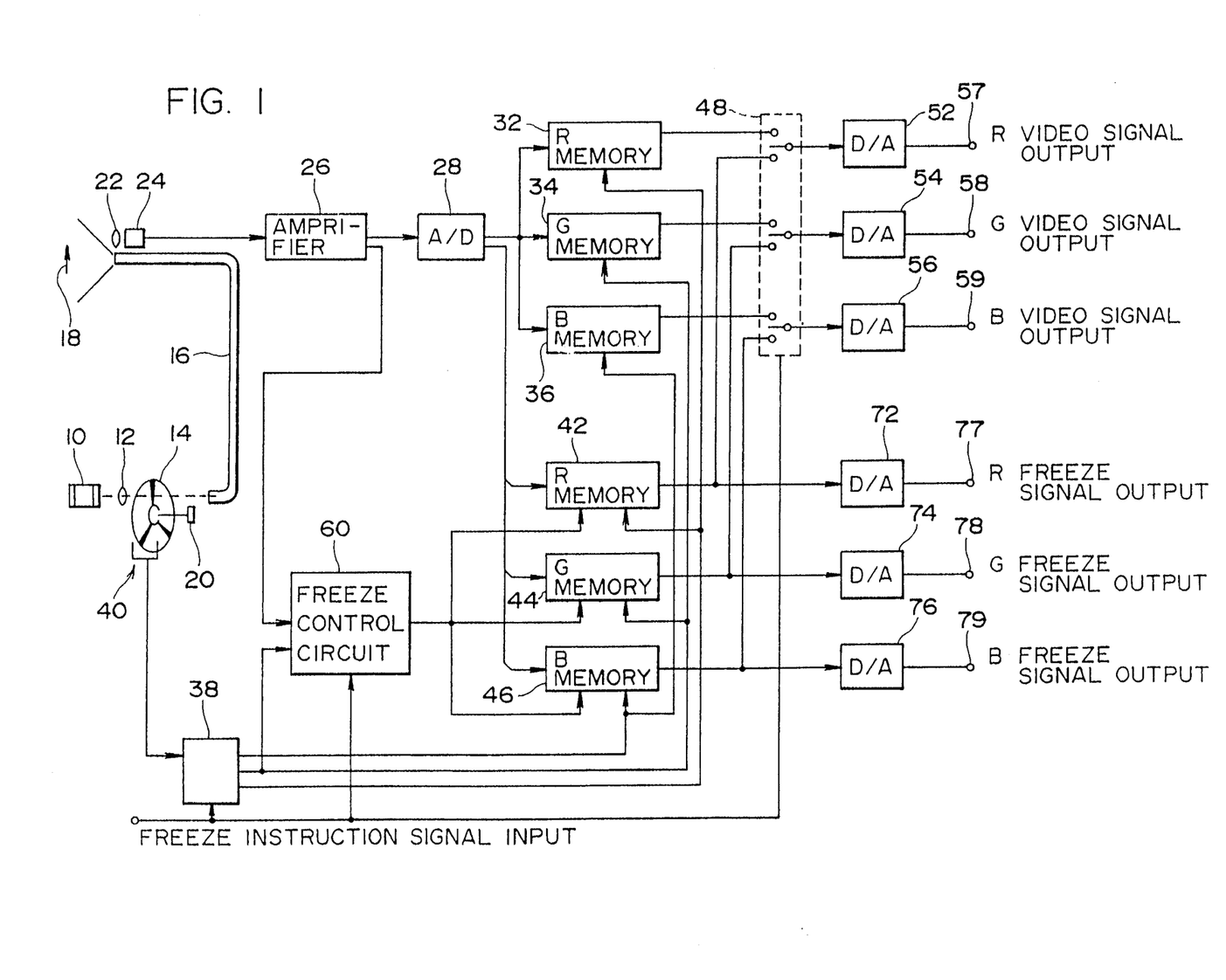
FIG. 1 is a block diagram of an embodiment of an electronic endoscope system according to the invention.

Referring first to FIG. 1, there is shown a block diagram of an embodiment of an electronic endoscope system according to the present invention. The electronic endoscope system picks up desired color images sequentially in a field sequential method, simultaneously converts field sequential image signals obtained by such image picking-up, and reproduces such signals as color images. In the electronic endoscope system, the light from an illumination lamp 10 illuminates an object to be photographed 18 from the leading portion of an endoscope through a condensing lens 12, a color filter disc 14 and a light guide 16. In other words, the color filter disc 14 includes red, green and blue filters each having a central angle of 120°, and the color filter disc 14 is being rotated by a motor 20 at a given speed of rotation (for example, 20 rps). Due to this, the light from the illumination lamp 10 is divided by means of the rotating color filter disc 14 into three illumination lights, that is, red (R), green (G) and blue (B) illumination lights which change sequentially at a cycle of 1/60 sec., and these illumination lights are then applied to the object 18 through the light guide 16.

There is arranged an image pickup lens 22 in the leading end portion of the endoscope. The image pickup lens 22 picks up the object 18 illuminated by the respective illumination lights, that is, R, G, and B lights, and then forms the image of the thus picked-up object 18 in the light receiving part of a CCD sensor 24. The CCD sensor 24 converts the incident lights to electric signals, that is, photo-electrically, and then outputs the R, G and B image signals respectively corresponding to the respective illumination lights through an amplifier 26 to A/D converter 28 and a freeze control circuit 60, respectively.

The A/D converter 28 converts the RGB image signals (which are analog signals) into digital signals, pixel by pixel, and then outputs the thus converted digital signals to 2 sets of R, G, B field memories 32, 34, 36 and field memories 42, 44, 46.

The field memories 32, 34, 36 are controlled by a field selection pulse generation circuit 38. In other words, the field selection pulse generation circuit 38 inputs signals in synchronization with the respective R,G,B illumination lights from a color filter position detector 40, and, in order that the RGB image signals corresponding to the respective illumination lights can be stored in the field memories corresponding to the respective colors, outputs writing signals sequentially to the respective field memories 32, 34, and 36 to update the storage contents thereof. The RGB image signals stored in these field memories 32, 34 and 36 are read out simultaneously and they are output from video output terminals 57, 58 and 59 by means of a change-over switch 48 and D/A converters 52, 54 and 56, respectively.

Then, the RGB video signals converted in the above manner are applied to a color TV so that they can be reproduced as color images on the color TV.

On the other hand, the field memories 42, 44 and 46 can be controlled by the field selection pulse generation circuit and freeze control circuit 60.

The freeze control circuit 60, as described before, is receiving the RGB image signals sequentially and is also arranged so that it is capable of inputting therein a freeze instruction signal to stop the monitor image and a G-EN pulse to allow G image signals to be input therein every 6 field periods (0.1 sec.) from the field selection pulse generation circuit 38. The freeze control circuit 60, in accordance with the G image signals input every 6 fields, checks every cycle (that is, every 0.1 sec.) whether the picked-up image is a still image or a moving image, updates the storage contents of the field memories 42, 44 and 46 to the latest RGB image signals each time the picked-up image is found a still image, and, if the freeze instruction signal is input, then latches the respective field memories 42, 44 and 46, respectively. Due to this, with the storage contents thereof remaining un-updatable for a previously set freeze period (that is, for several seconds), the respective field memories 42, 44 and 46 output the RGB image signals of the same screen, so that the resultant monitor images provide still images which have no color discrepancies.

Next, description will be given below in detail of the above-mentioned freeze control circuit 60 with reference to FIGS. 2 and 3.

Figure 2:
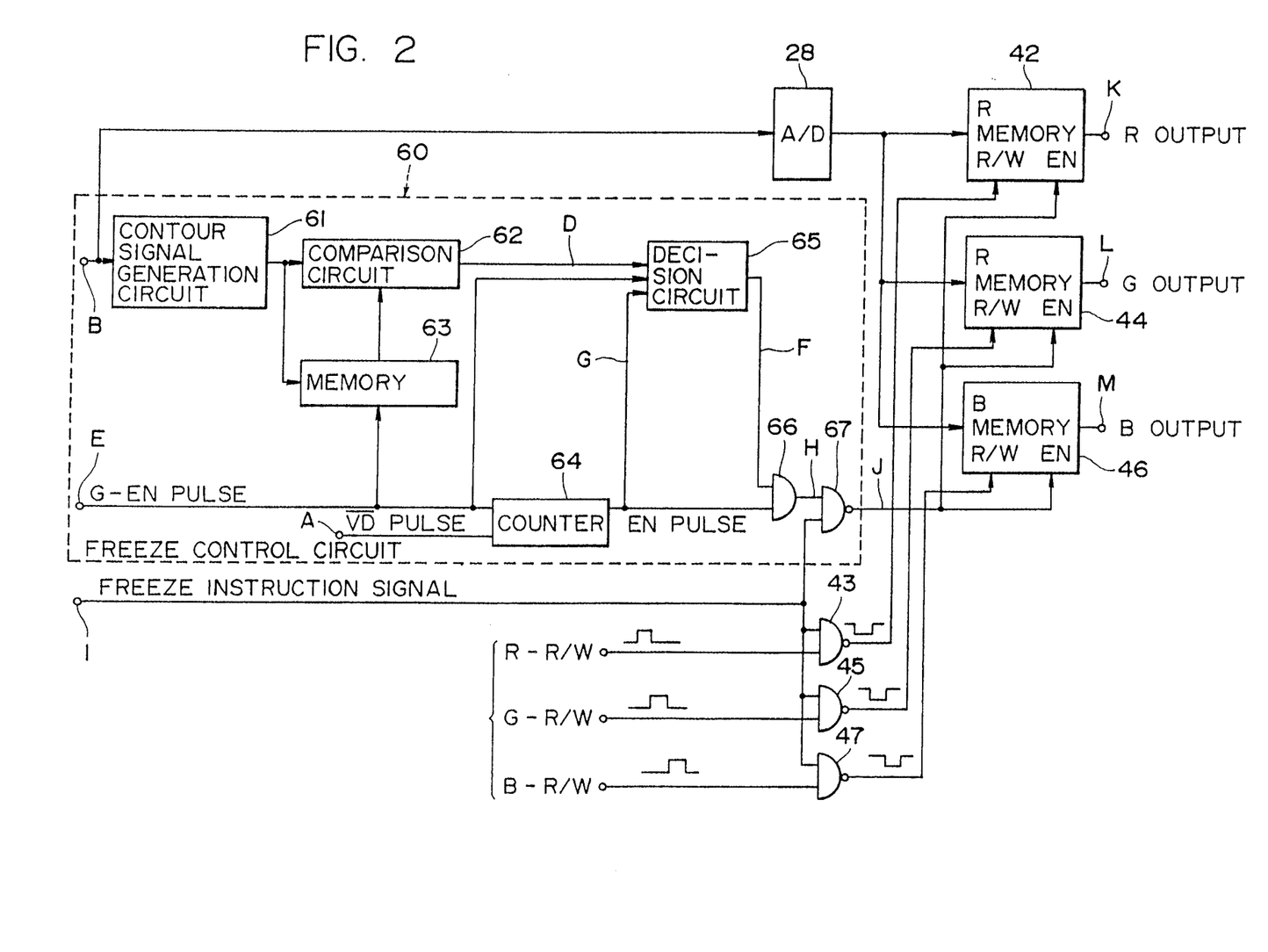
FIG. 2 is a block diagram including the details of a freeze control circuit shown in FIG. 1.

In FIG. 2, there is shown a block diagram of an embodiment of the above-mentioned freeze control circuit 60. The illustrated freeze control circuit 60 comprises a contour signal generation circuit 61, a comparison circuit 62, a memory 63, a counter 64, a decision circuit 65, an AND circuit 66 and a NAND circuit 67.

Figure 3A:
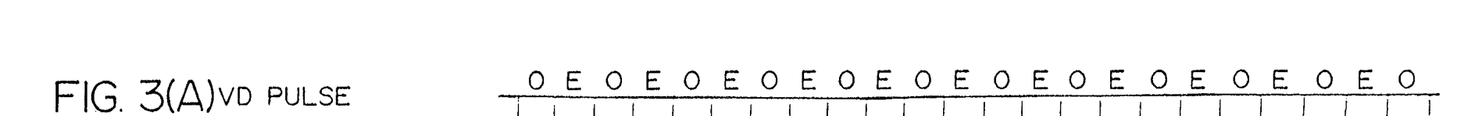
FIGS. 3(A) to (M) are respectively signal wave form charts of the respective parts of the above electronic endoscope system, used to explain FIG. 2.
Figure 3B:
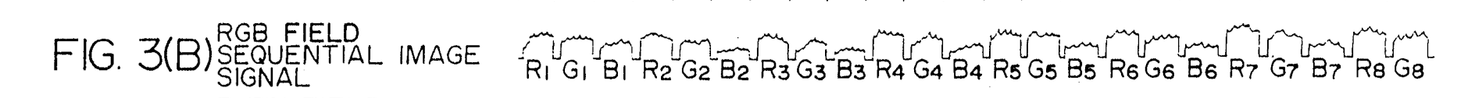

To the contour signal generation circuit 61 is being applied an RGB field sequential image signal from an input terminal B (FIG. 3)). This image signal is an R, G, B image signal which is input in the field sequential method, and it has a wave form in synchronization with the cycle of a VD pulse (FIG. 3(A)). In FIG. 3(A), O designates an odd field and E stands for an even field.

The contour signal generation circuit 61 detects a contour portion (a position in which the contrast is suddenly changed) of an image shown by the image signal input therein, and outputs a contour signal corresponding to the detected contour signal to the comparison circuit 62 and memory 63.

Figures 3C, 3D:
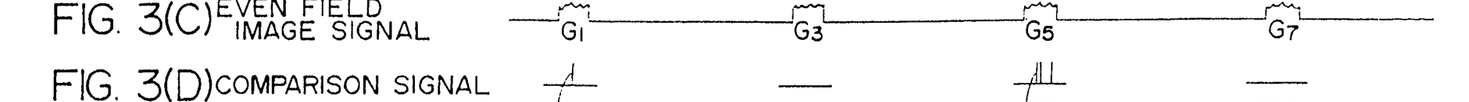

The memory 63 stores the above-mentioned contour signal provisionally and outputs it to the comparison circuit 62 after the lapse of a given time (0.1 sec.). In particular, the memory 63 is enabled only while the G image signal (FIG. (C)) of the even field is being output in accordance with a G-EN pulse (FIG. 3(E)) applied through an input terminal E by the field selection pulse generation circuit 38, and writes thereinto the contour signal applied from the contour signal generation circuit 61 and after the lapse of 0.1 sec. reads out the written contour signal.

Figures 3E, 3F:
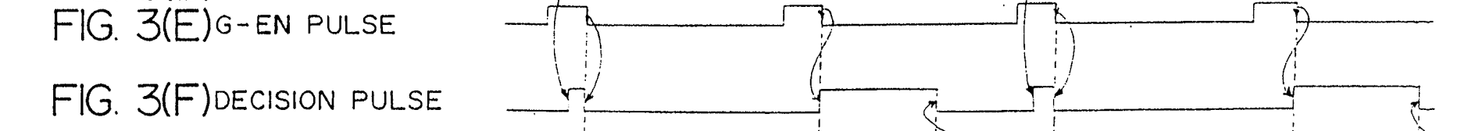
Figure 3G:
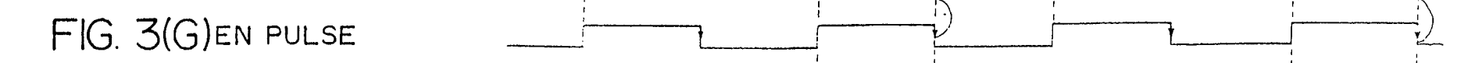
Figure 3H:
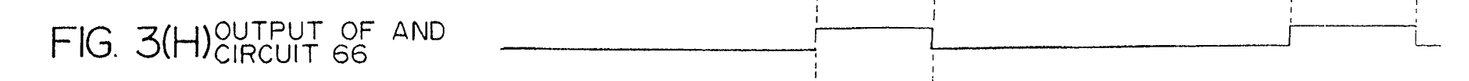

The comparison circuit 62 compares the contour signal applied from the contour signal generation circuit 61 with a contour signal for a G image signal of an even field applied and 0.1 sec. delayed from the memory 63. Then, as shown in FIG. 3(G), outputs through a line D to the decision circuit 65 a comparison signal indicating the coincidence or non-coincidence of the two input signals (that is, a pulse signal which goes to its H level when the two input signals do not coincide with each other (FIG. 3 (D)).

To the other input of the decision circuit 65 are being applied a G-EN pulse (FIG. (E)) from the input terminal E and an EN pulse (FIG. (G)) through a line G from the counter 64. Here, the counter 64 is inputting therein the G-EN pulse and VD pulse. Thus, as shown in FIG. 3, the counter 64 goes to the H level thereof in synchronization with the G-EN pulse when the G-EN pulse rises (FIG. 3(E)), and after then outputs an EN pulse (FIG. 3(G)) going down to the L level thereof if three VD pulses (FIG. 3(A)) are counted.

The decision circuit 65 outputs a decision pulse indicating whether the picked-up image is a still or moving image. The decision pulse, as shown in FIG. 3(F), is a pulse signal which goes up to the H level in synchronization with the comparison signal (which is the first pulse signal), also when in the H level thereof goes down to the L level in synchronization with the G-EN pulse when the G-EN pulse falls, and further when in the H level goes down to the L level in synchronization with the EN pulse when the EN pulse falls.

In other words, when the picked-up image is decided as a still image, the decision circuit 65 outputs a decision pulse which rises in synchronization with the falling of the G-EN pulse and after the lapse of 3 field periods goes down. When decided as a moving image, the decision circuit 65 outputs a decision pulse which rises in synchronization with the comparison signal (that is, the first pulse signal) and falls in synchronization with the falling of the G-EN pulse.

The above-mentioned decision pulse output from the decision circuit 65 is applied to the AND circuit 66. Also, the EN pulse from the counter 64 is being applied to the other input of the AND circuit 66. The AND circuit 66 ANDs the two input pulses and applies the AND output thereof (FIG. 3(H)) through a line H to the NAND circuit 67.

Figure 3I:
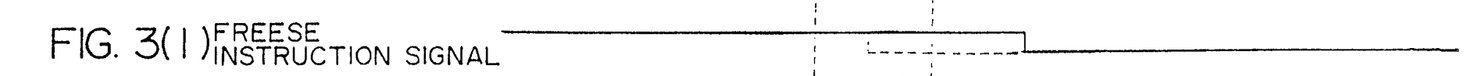
Figure 3J:
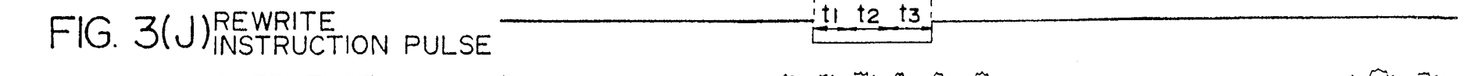
Figures 3K, 3L, 3M:
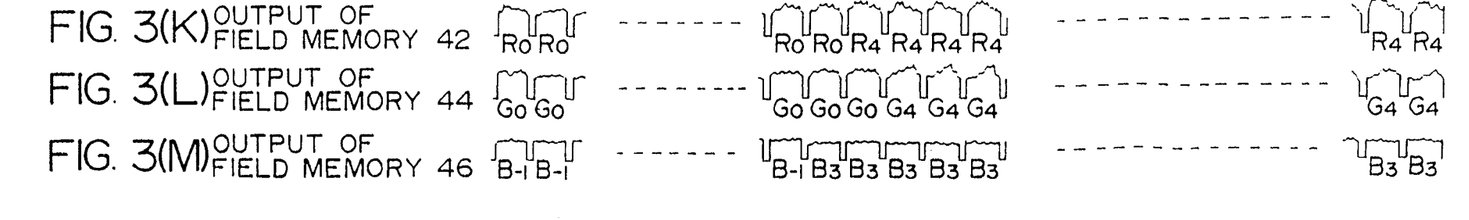

The NAND circuit 67 is arranged such that a freeze instruction signal (FIG. 3(I)) to go to the L level when a freeze instruction is applied can be input from an input terminal I to the other input of the NAND circuit 67. When the output of the AND circuit 66 goes to the H level and the freeze instruction signal is not output (that is, it is a H level signal), then the NAND circuit 67 outputs a rewrite instruction pulse of L level (FIG. 3(J)) to the enable terminals EN of the field memories 42, 44, and 46 by means of a line J.

On the other hand, the field memories 42, 44, and 46 are respectively arranged such that the write signals for the RGB image signals can be applied from the NAND circuits 43, 45 and 47 to the terminals R/W of the field memories 42, 44 and 46, respectively. Here, to the NAND circuits 43, 45 and 47 are being applied field selection pulses R-R/W, G-R/W, and B-R/W which respectively select the RGB image signals by colors. Also, to the other inputs thereof are being applied freeze instruction signals. When the freeze instruction signal is not output (that is, when it is an H level signal), the NAND circuits 43, 45 and 47 output writing signals (L-level signals) for the RGB image signals sequentially to the terminals R/W of the field memories 42, 44 and 46.

The field memories 42, 44 and 46 are rewritable only when the rewrite instruction pulses are applied from the freeze control circuit 60 to the enable terminals EN thereof and write the field sequential RGB image signals in accordance with the write signals sequentially applied to the R/W terminals thereof from the NAND circuits 43, 45 and 47, respectively. In other words, the storage contents of the field memories 42, 44 and 46 are rewritten from $B_{-1}$ to $B_3$ image signal for a period of $t_1$ of the rewrite instruction pulse in FIG. 3(J), from $R_0$ to $R_4$ image signal for $t_2$, and from $G_0$ to $G_4$ image signal for $t_3$. And, the RGB image signals stored in the field memories 42, 44 and 46 are read out simultaneously and output to the output terminals K, L and M of R, G and B (FIG. 3(K), (L), (M)). It should be noted here that, while the field memories are writing the image signals, the image signals being thus written are read out simultaneously.

Due to the fact that, as described before, the rewrite instruction pulse is output when the picked-up image is decided as a still image and the freeze instruction is not being output (that is, the freeze instruction signal is an H level signal), the image signal of the latest still image prior to input of the freeze instruction is stored in the field memories 42, 44 and 46. On the other hand, if the freeze instruction is input, then the rewrite instruction pulse will be output no longer to prohibit the updating of the storage contents of the field memories 42, 44 and 46, so that a still image with no color discrepancy can be obtained.

The RGB image signals read out simultaneously from the field memories 42, 44 and 46, as shown in FIG. 1, are output to the change-over switch 48 and at the same time are output through D/A converters 72, 74 and 76 to video output terminals 77, 78 and 79, respectively.

Depending on whether the freeze instruction signal is input or not, the change-over switch 48 switchingly outputs either the outputs of the field memories 42, 44 and 46 or the outputs of the field memories 32, 34 and 36. For this reason if the video output terminals 57, 58 and 59 are connected to a color TV, then a moving image or a still image can be reproduced.

On the other hand, by connecting the video output terminals 77, 78 and 79 to the color TV, when the freeze instruction is not input, the latest still images being currently picked up with no color discrepancy can be updated and reproduced sequentially. When the freeze instruction is input, the latest still images being stored at the time of inputting of the freeze instruction with no color discrepancy can be reproduced.

As shown by a dotted line in FIG. 3 (I), when the freeze instruction is input while the AND circuit 66 is outputting an H level output, then a rewrite instruction pulse having a length of 3 fields as shown in FIG. 3 (J) can be obtained no longer.

Figure 4:
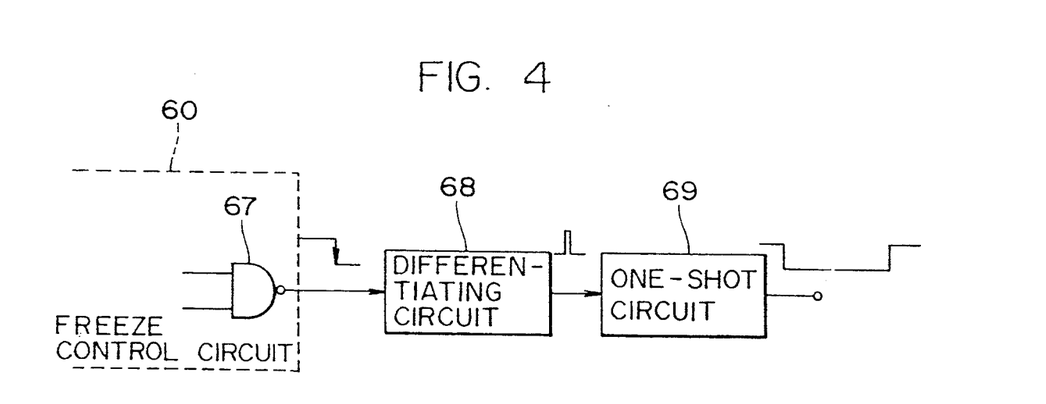
FIG. 4 is a block diagram of a modification of the freeze control circuit shown in FIG. 2.

In order to cope with this, for example, as shown in FIG. 4, there may be provided a differentiating circuit 68 and a one-shot circuit 69 downstream of the NAND circuit 67 of the above-mentioned freeze control circuit 60, whereby the rising of the output of the NAND circuit 67 may be differentiated by the differentiating circuit 68, the resultant differential signal may be applied as a trigger signal to the one-shot circuit 69, and a rewrite instruction pulse having a length of 3 fields may be output from the one-shot circuit 69.

Figure 5:
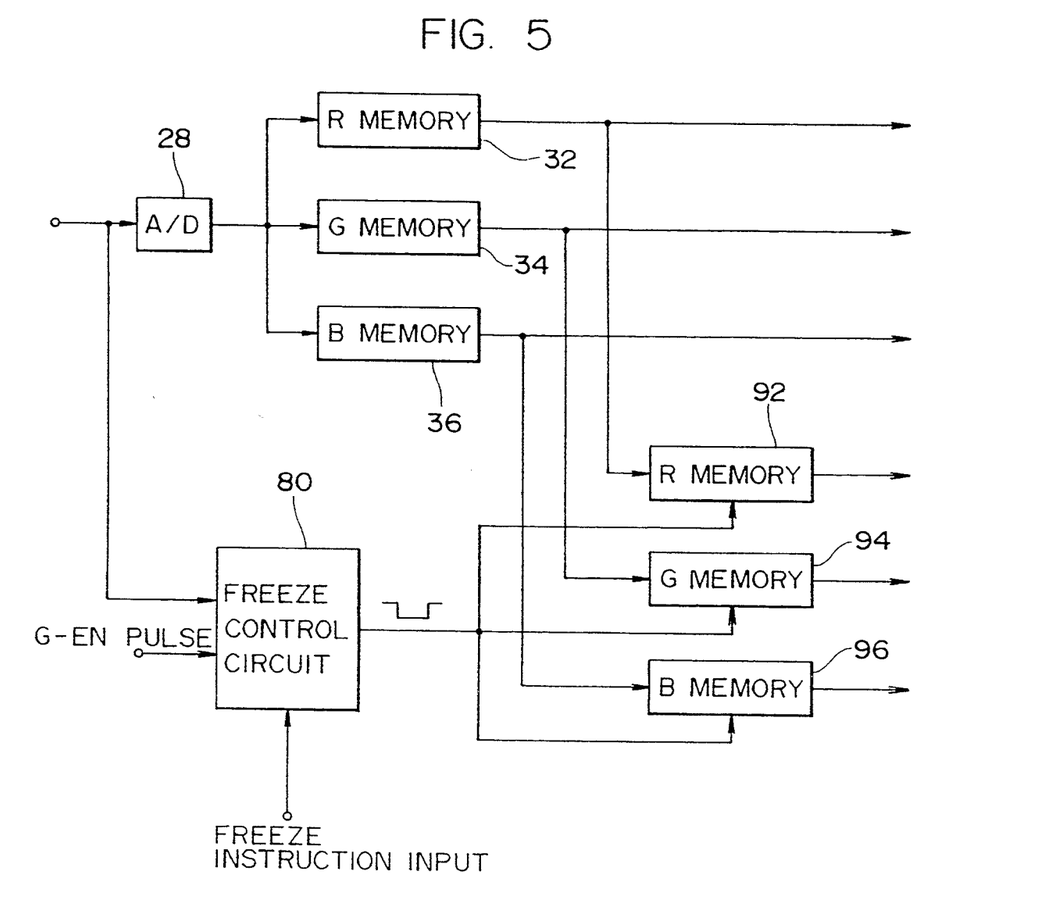
FIG. 5 is a block diagram of main portions of the above embodiment according to the invention.

Now, referring to FIG. 5, there is shown a block diagram of main parts of another embodiment of an electronic endoscope system according to the invention. In FIG. 5, parts used in common with FIG. 1 are given the same designations and the description thereof is omitted here.

In FIG. 5, a freeze control circuit 80 is similar in structure to the freeze control circuit 60 shown in FIG. 1, but the former is different from the latter in that the former outputs a rewrite instruction pulse having a length of a field when the picked-up image is found as a still image. Also, field memories 92, 94 and 96 are respectively arranged such that they can input therein the outputs of the field memories 32, 34 and 36.

In this embodiment, if the rewrite instruction pulse is applied from the freeze control circuit 80 to the respective field memories 92, 94 and 96, then the RGB image signal stored in the respective field memories 92, 94 and 96 are rewritten simultaneously to the RGB image signals output at that time from the respective field memories 32, 34 and 36, respectively.

According to this structure, the time necessary to rewrite the RGB image signals can be reduced over the structure shown in FIG. 1, and also the RGB image signals can be rewritten to those closer (that is, closer by a length of 2 fields) to the time at which the picked-up image is decided as a still image.

Figure 6:
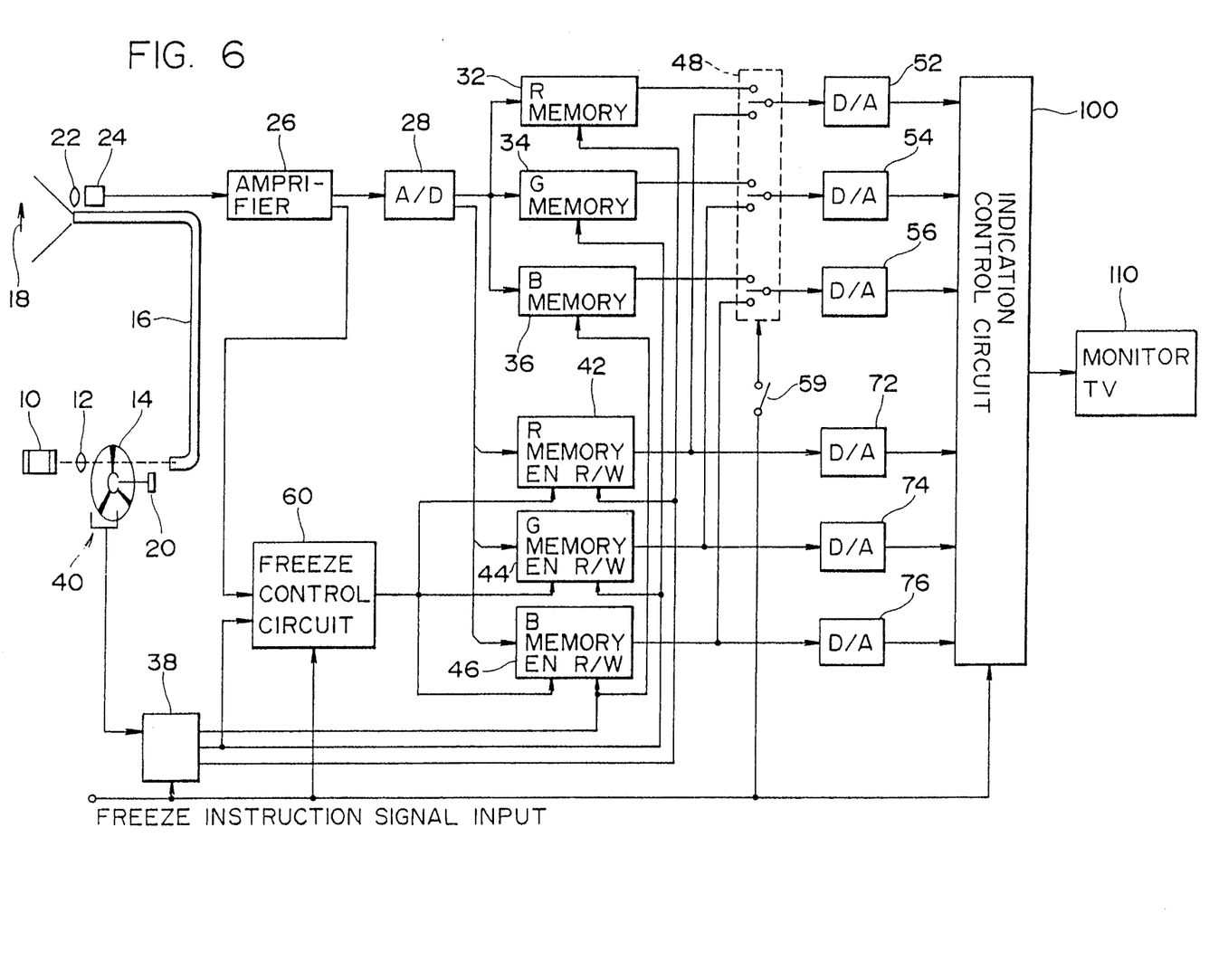
FIG. 6 is a block diagram of another embodiment of an electronic endoscope system according to the invention; and, FIGS. 7(A) to (C) are views respectively to show the display states of a monitor TV shown in FIG. 6.

Referring now to FIG. 6, there is shown a block diagram of still- another embodiment of an electronic endoscope system according to the invention. In FIG. 6, parts used in common with FIG. 1 are given the same designations and the detailed description thereof is omitted here.

Figure 7A:
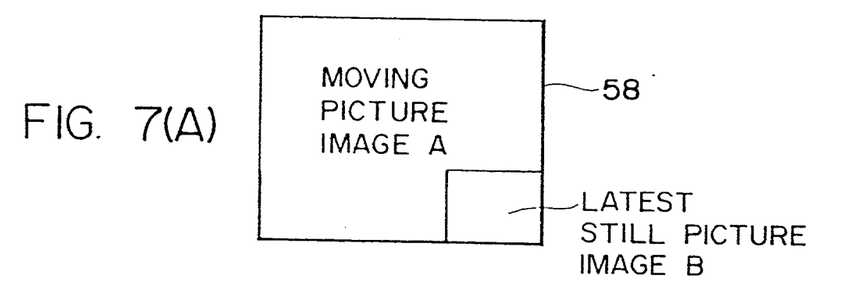
Figure 7B:
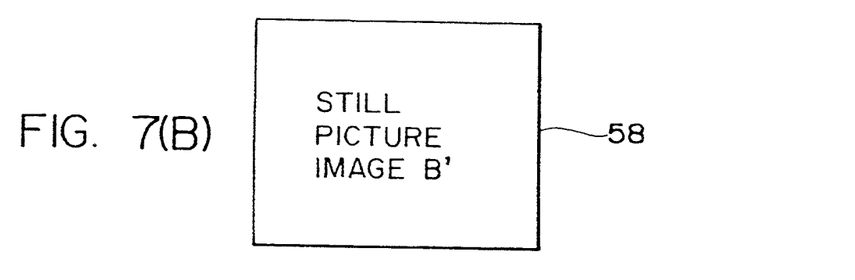

In FIG. 6, a display control circuit 100 switches moving still images, in accordance with RGB image signals (which are hereinafter referred to as a first image signal) respectively input from the D/A converters 52, 54 and 56 as well as with RGB image signals (which are hereinafter referred to as a second image signal) respectively input from the D/A converters 72, 74 and 76, and displays the thus switched images on a monitor TV 110. In particular, if the freeze instruction signal is not input, then the display control circuit 100, as shown in FIG. 7(A), displays a moving picture image A on a large scale in accordance with the first image signal and at the same time displays the latest still picture image B with no color discrepancy on a small scale in the same screen in accordance with the second image signal. On the other hand, if the freeze instruction signal is input, then the display control circuit 100 performs a display such as shown in FIGS. 7(B) or (C) in accordance with the on/off of a switch 59. In other words, if the switch 59 is on when the freeze instruction signal is input, then the first and second image signals are entirely the same signal and thus, as shown in FIG. 7(B), only a still picture image B' is displayed on a large scale. If the switch 59 is off when the freeze instruction signal is input, then the still picture image B' is displayed on a large scale in accordance with the second image signal and at the same time the moving picture image A is displayed on a small scale on the same screen in accordance with the first image signal, as shown in FIG. 7(C).

According to the above-mentioned structure, when the freeze instruction is output while the moving picture image A shown in FIG. 7(A) is being viewed, the still picture image B' may be different from the desired scene (that is, the moving picture image A) if the moving picture image A has color discrepancies, because the still picture image B' in FIG. 7(B) is an image occurring prior to the moving picture image and having no color discrepancies.

On the other hand, when the freeze instruction is output while the latest still picture image B in FIG. 7(A) is being viewed, then the then latest still picture image B coincides with the still picture image B' in FIG. 7 (B), so that a desired scene with no color discrepancy can be stopped. That is, the display of the latest still picture image can be used as a standard in stopping a desired scene with no color discrepancy (that is, in the freeze instruction).

Figure 7C:
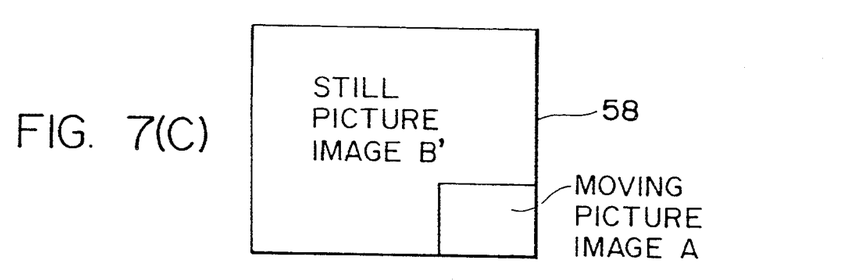

Also, as shown in FIG. 7(C), if the still picture image B' is displayed on a large scale and at the same time the moving picture image A is displayed on a small scale on the same screen, then the current pictures image can be always viewed even when making an endoscope diagnosis through the still picture image B', thereby providing a longer freeze time.

Figure 8:
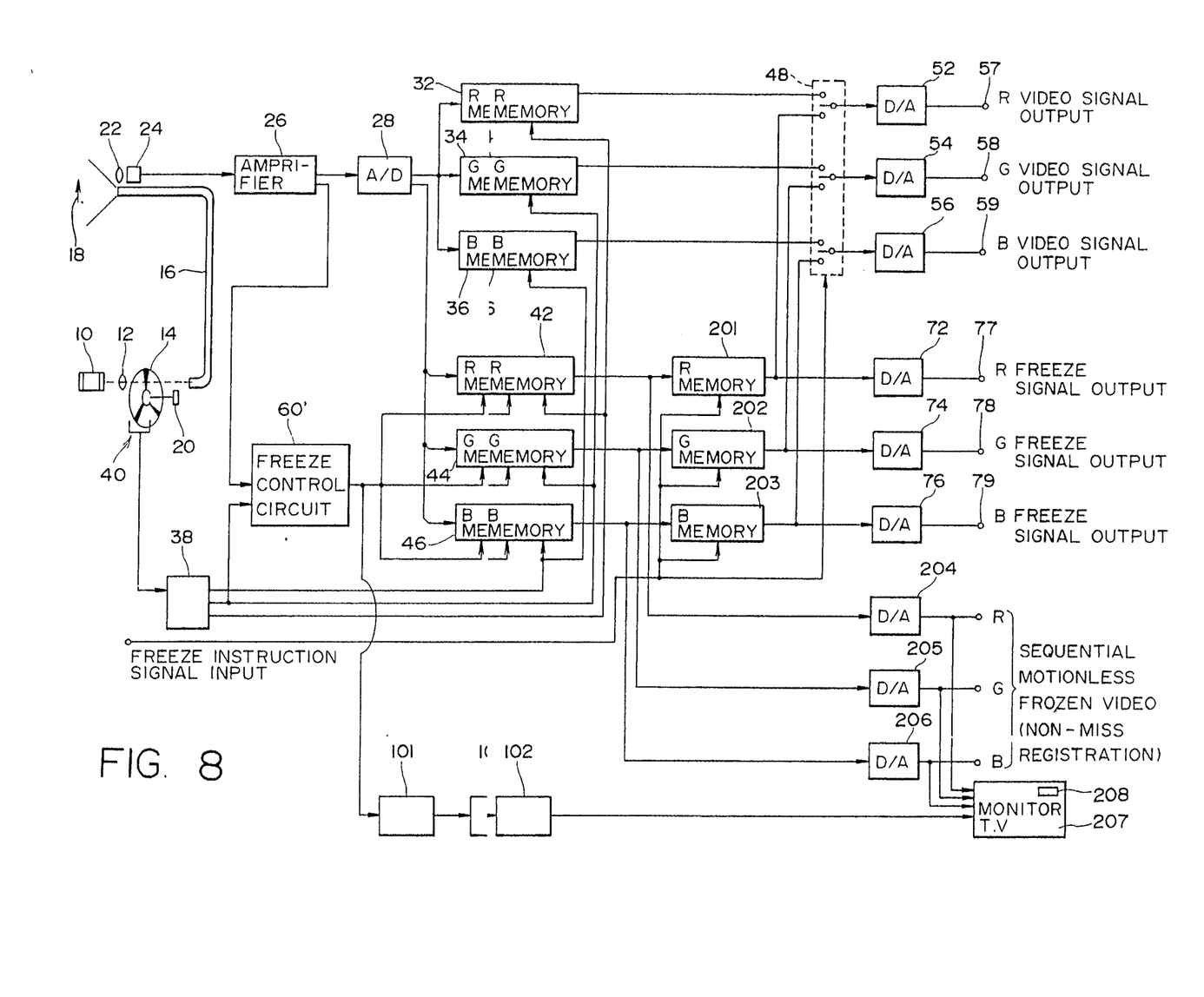
FIG. 8 is a block diagram of another more embodiment of an electronic endoscope system according to the invention.

Referring now to FIG. 8, there is shown another embodiment which, in addition to the parts employed in the embodiment shown in FIG. 1, includes R, G, and B memories 201, 202 and 203, D/A converts 204, 205 and 206, a monitor 207, a rewrite detection circuit 101, and a sign control circuit 102.

In this figure, a freeze control circuit 60' is different from the freeze control circuit 60 in that it has not received there in a freeze instruction signal and, for this reason, irrespective of presence of the freeze instruction signal, if the picked-up image is decided as a still image, then the freeze control circuit 60' outputs rewrite instruction pulses to the memories 42, 44 and 46, and also to the rewrite detection circuit 101.

On receiving a freeze instruction, the memories 201, 202 and 203 write the image signals of the memories 42, 44, and 46, respectively. Thus, in the former memories, there are stored such still image signals that have been decided as necessary by an operator, and the still image signals of the memories 201, 202 and 203 are to be output to the change-over switch 48.

On the other hand, the rewrite detection circuit 101, on receiving the rewrite instruction pulse from the freeze control circuit 60', outputs to the sign control circuit 102 a sign signal, for example, a sign signal having a given pulse width (0.1 sec.). While the above-mentioned sign signal is being input therein, the sign control circuit 102 is outputting a character signals representing a sign 208 so that the sign 208 can be superimposed in the picture image of the monitor 207.

Due to the fact that the above-mentioned circuits are added, even when the freeze instruction signal is sent out, the still image signals of the memories 42, 44 and 46 to be updated can be output to the monitor 207 through the D/A converters 204, 205 and 206, so that these still image signals can be projected on the monitor 207 in the form of quasi-freeze images to be updated moment by moment. Also, during this operation, for each updating, the sign 208 indicating that the freeze image has been updated can be displayed on the monitor 207 by use of the rewrite detection circuit 101 and sign control circuit 102. Therefore, by observing the quasi-freeze images to be updated momentarily, the operator can easily decide which images are necessary.

Although in the present embodiment, among the color images sequentially input, the images of the same color are compared with each other, the images of different colors may be compared. Also, means for deciding whether the picked-up image is a moving image or a still image is not limited to the decision means illustrated in the present embodiment, but other decision means can be employed, provided that it is able to decide based on the coincidence or non-coincidence of two color images, including, for example, decision means which performs its decision based on the mutual relationship between leading and following color images.

As has been described heretofore, according to the electronic endoscope system of the present invention, whether the picked-up image is a still image or a moving image is decided in accordance with the coincidence or non-coincidence of leading and following images picked up in a field sequential method, each time it is decided as a still image the storage contents of a memory provided exclusively for freezing are updated to the latest field sequential image signals, and, if a freeze instruction is input, then the updating of the storage contents is immediately prohibited, whereby a still picture image with no color discrepancy can be always reproduced by the freeze instruction and the image can be stopped immediately at the same time of the input of the freeze instruction with no time lag being felt.

Also, due to the fact that the output of an ordinary memory used to simultaneously convert the field sequential image signals and the output of the above-mentioned exclusive freeze memory can be switched to each other according to cases, a moving picture image or the above still picture image can be displayed on a monitor as occasion arises.

Further, a moving picture image and a still picture image can be displayed on a monitor TV in a switchable manner in accordance with the output of an ordinary memory for simultaneous conversion of field sequential image signals and the output of the above-mentioned exclusive freeze memory, and also while the moving picture image being displayed the latest still picture image can be displayed on a small scale in the same screen.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic endoscope system for sequentially picking up images by colors in a field sequential method, simultaneously converting field sequential image signals obtained by such image picking-up, and reproducing the converted images as color picture images, said electronic endoscope system comprising:

memory means for storing field sequential image signals each of a field or a frame by colors, and outputting said image signals simultaneously;

decision means for inputting therein field sequential image signals each of a field or a frame at a given cycle, and, in accordance with the two succeeding field sequential image signals each of a field or a frame input therein, deciding whether the image is a still picture image or a moving picture image; and, control means for updating the storage contents of said memory means with the latest field sequential image signals of a still picture image each time said decision means decides that the image is a still picture image so as to store the most recent still picture image, and, if a freeze instruction is thereafter input, prohibiting the updating of the storage contents of said memory means whereby a still picture image free of color discrepancies is already present and available for utilization when the freeze instruction is input.

2. An electronic endoscope system for sequentially picking up images by colors in a field sequential method, simultaneously converting field sequential image signals obtained by such image picking-up by means of a first memory means for storing field sequential image signals by colors, and reproducing the converted images as color images, said electronic endoscope system comprising:

a second memory means for storing field sequential image signals each of a field or a frame by colors and outputting said image signals simultaneously;

switch means for switchingly outputting either of the output of said first memory means or the output of said second memory means;

decision means for inputting therein at a given cycle field sequential image signals each of a field or a frame and, in accordance with field sequential image signals each of a field or a frame input before and after the field sequential image signal to be decided is input, deciding at every given cycle whether the image is a still picture image or a moving picture image; and, control means, each time said decision means decides the image is a still image, for updating the storage contents of said second memory means with the latest field sequential image signals and store all the fields of the most recent still picture color image and, if a freeze instruction is input, then prohibiting the updating of the storage contents of said second memory means only for a given freeze period and switching said switch means over to the output side of said second memory means whereby a still picture image having no color discrepancies is present in said second memory means for utilization at the time a freeze instruction is input.

3. An electronic endoscope system comprising:

image pickup means for sequentially picking up images by colors in a field sequential method and obtaining field sequential image signals by such image picking-up;

first and second memory means respectively for storing said field sequential image signals by colors and outputting said signals simultaneously;

decision means for inputting therein at a given cycle field sequential image signals each of a field or a frame and, in accordance with field sequential image signals each of a field or a frame input before and after the image signal to be decided is input, deciding at every given cycle whether the image is a still picture image or a moving picture image;

control means, each time said decision means decides the image is a still picture image, for updating the storage contents of said second memory means with the latest field sequential image signals and store all of the color frames of the most recent still picture image and, if a freeze instruction is input, then prohibiting the updating of the storage contents of said second memory means, whereby a still picture image devoid of color discrepancies is already available for utilization at the time a freeze instruction is input;

a single display means; and, display control means responsive to a freeze instruction signal for inputting simultaneous first and second color image signals respectively output from said first and second memory means, when a freeze instruction is not input, displaying a color picture image corresponding to said first color image signal on a large portion of the screen of said display means and at the same time displaying a color picture image corresponding to said second color image signal on a small portion of the same screen, and, when a freeze instruction is input, displaying a still color picture image corresponding to said second color image signal at least on said large portion of the screen of said display means.

4. An electronic endoscope system as set forth in claim 3, wherein said display control means displays only the color picture image corresponding to said second color image signal on the entire screen of said display means when a freeze instruction is input.

5. An electronic endoscope system as set forth in claim 3, wherein said display control mans displays a color picture image corresponding to said second color image signal on said large portion of the screen of the said display means and at the same time displays a color picture image corresponding to said first color image signal on said small portion of the same screen when a freeze instruction is input.

6. An electronic endoscope system as set forth in claim 3 wherein said first color picture signal comprises a moving image signal and said second color picture signal comprises a still image signal.

7. An electronic endoscope system for sequentially picking up images by colors in a field sequential method, simultaneously converting field sequential image signals obtained by such image picking-up by means of a first memory means for storing field sequential image signals by colors, and reproducing the converted images as colors images, said electronic endoscope system comprising:

a second memory means for storing field sequential image signals each of a field or a frame by colors and outputting said image signals simultaneously;

a third memory means for storing the field sequential image signals each of a field or a frame by colors that are output from said second memory means, outputting said image signals simultaneously, and, on receiving therein a freeze instruction, holding its storage contents;

decision means for inputting therein at a given cycle field sequential image signals each of a field or a frame and, in accordance with field sequential image signals each of a field or a frame input before and after the field sequential image signal to be decided is input, deciding at every given cycle whether the image is a still picture image or a moving picture image;

control means, each time said decision means decides the image as a still image, for allowing the storage contents of said second memory means to be updated to the latest field sequential image signals; and, first and second output terminals capable of outputting the outputs of said second and third memory means to first and second monitors, respectively.

8. An electronic endoscope system as set forth in claim 7, said first monitor reproducing color images in accordance with image signals output from said first output terminal, and means for allowing a sign indicating that said color image on Said first monitor has been updated to be displayed on said first monitor each time said decision means decides the image as a still image.

9. A field sequential electronic color endoscope system for detecting and converting field sequential image signals obtained by an image pick-up device and thereafter reproducing the converted images as color picture images, comprising:

means for storing detected sequential field or frame image signals of each primary color and simultaneously outputting said image signals;

decision means responsive to said field sequential image signals of each said field or frame at a given cycle, and, in accordance with two successive field sequential image signals inputted thereto, determining whether the image is a still picture image or a moving picture image; and control means for updating the storage contents of said memory means with the latest field sequential image signals each time said decision means determines that the image detected is a still picture image so as to store a complete color image including all of the primary colors of the most recent still picture image to the most recent and when a freeze instruction is subsequently input, prohibiting the updating of the storage contents of said memory means, whereby the last still image having no color discrepancies is detected and stored for subsequent utilization prior to a freeze instruction being input.

* * * * *